United States Patent
Chen et al.

(10) Patent No.: US 10,228,278 B2
(45) Date of Patent: Mar. 12, 2019

(54) DETERMINING A HEALTH CONDITION OF A STRUCTURE

(71) Applicant: NATIONAL ICT AUSTRALIA LIMITED, Eveleigh, NSW (AU)

(72) Inventors: Fang Chen, Eveleigh (AU); Matt Zhang, Eveleigh (AU); Zhidong Li, Eveleigh (AU); Yang Wang, Eveleigh (AU)

(73) Assignee: NATIONAL ICT AUSTRALIA LIMITED, Eveleigh, New South Wales (AU)

( * ) Notice: Subject to any disclaimer, the term of this patent is extended or adjusted under 35 U.S.C. 154(b) by 529 days.

(21) Appl. No.: 14/787,912

(22) PCT Filed: Nov. 22, 2013

(86) PCT No.: PCT/AU2013/001351
§ 371 (c)(1),
(2) Date: Oct. 29, 2015

(87) PCT Pub. No.: WO2014/176625
PCT Pub. Date: Nov. 6, 2014

(65) Prior Publication Data
US 2016/0238438 A1    Aug. 18, 2016

(30) Foreign Application Priority Data
May 1, 2013    (AU) ................. 2013901528

(51) Int. Cl.
*G01M 5/00* (2006.01)
*G01H 13/00* (2006.01)
(Continued)

(52) U.S. Cl.
CPC ............... *G01H 13/00* (2013.01); *G01H 1/00* (2013.01); *G01M 5/0008* (2013.01);
(Continued)

(58) Field of Classification Search
CPC ....... G01H 13/00; G01H 1/00; G01M 5/0008; G01M 5/0033; G01M 5/0066
(Continued)

(56) References Cited

U.S. PATENT DOCUMENTS 4,901,575 A    2/1990  Bohannan et al.
5,195,046 A    3/1993  Gerardi et al.
(Continued)

OTHER PUBLICATIONS

PCT International Search Report and the Written Opinion of the International Searching Authority, Australi Patent Office, PCT/AU2013/001351, 8 pages, Dec. 12, 2013.
(Continued)

*Primary Examiner* — Eman Alkafawi

(57) ABSTRACT

The disclosure relates to structural health monitoring (SHM). In particular determining a health condition of a structure, such as a bridge, based on vibration data measured of the bridge. Measured vibration data is calibrated (410-450). Features are then extracted from the calibrated data (610-630) and a support vector machine classifier is then applied (720) to the extracted features to determine (730) the health condition of a part of the structure. Training of the support vector machine classifier by a machine learning process (910) is also described.

14 Claims, 10 Drawing Sheets

(51) Int. Cl.
  *G01H 1/00* (2006.01)
  *G01M 7/02* (2006.01)
  *G01M 7/00* (2006.01)
(52) U.S. Cl.
  CPC ........ *G01M 5/0033* (2013.01); *G01M 5/0066* (2013.01); *G01M 7/00* (2013.01); *G01M 7/025* (2013.01)
(58) Field of Classification Search
  USPC .......................................................... 702/33
  See application file for complete search history.

(56) References Cited

U.S. PATENT DOCUMENTS

| | | | |
|---|---|---|---|
| 5,255,565 | A | 10/1993 | Judd et al. |
| 6,192,758 | B1 | 2/2001 | Huang |
| 6,257,064 | B1 | 7/2001 | Duron |
| 7,146,846 | B2 | 12/2006 | Mahaffey et al. |
| 7,577,539 | B2 | 8/2009 | Hubanks et al. |
| 7,647,206 | B2 | 1/2010 | Ford |
| 7,786,850 | B1 | 8/2010 | Arcaini et al. |
| 8,209,134 | B2 | 6/2012 | Parker et al. |
| 2004/0174542 | A1* | 9/2004 | Handman .............. G01B 11/16 356/622 |
| 2005/0116833 | A1 | 6/2005 | Miller |
| 2005/0163384 | A1* | 7/2005 | Avni ...................... B82Y 10/00 382/218 |
| 2009/0063081 | A1 | 3/2009 | Xu |
| 2009/0204344 | A1* | 8/2009 | Daraio ............... G01N 29/2437 702/39 |
| 2009/0301198 | A1* | 12/2009 | Sohn .................... G01N 29/069 73/598 |
| 2010/0242609 | A1 | 9/2010 | Lee et al. |
| 2014/0316708 | A1* | 10/2014 | Mollineaux ......... G01M 5/0033 702/15 |
| 2017/0184470 | A1* | 6/2017 | Rice ...................... H04W 24/00 |

OTHER PUBLICATIONS

Examination Report No. 1, Australian Patent Office, Australian Application No. 2013388670, dated Sep. 7, 2017, 5 pages.

Bornn et al., *Structural health monitoring with autoregressive support vector machines*, Journal of Vibration and Acoustics, Apr. 2009, Vo. 131, 9 pages.

Worden et al., *Damage identification using support vector machines*, Institute of Physics Publishing, Smart Materials and Structures, Smart Mater, Struct. 10, 2001, pp. 540-547.

* cited by examiner

DETERMINING A HEALTH CONDITION OF A STRUCTURE

CROSS-REFERENCE TO RELATED APPLICATIONS

The present application claims priority from Australian Provisional Patent Application No 2013901528 filed on 1 May 2013, the content of which is incorporated herein by reference.

TECHNICAL FIELD

The present invention generally relates to structural health monitoring (SHM). Aspects of the invention include computer-implemented methods, software and systems for determining a health condition of a structure, such as a bridge, based on vibration data of the bridge.

BACKGROUND

A structure, such as a bridge, building or a tower, normally consists of multiple structural components. These structural components are connected typically by mechanical means to provide workability of the structure. In this disclosure, the connection between structural components (typically joints) or the structural components themselves are referred to as a part of the structure. A part of the structure may deteriorate with use of the structure over time, which degrades integrity of the structure and may cause economic loss or personal injuries. Therefore, the health condition of the structure is monitored constantly or regularly in many ways to avoid undesired loss or injuries.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

SUMMARY

In a first aspect of the invention there is provided a computer-implemented method for determining a health condition of a part of a structure, comprising:
  receiving or accessing vibration data of the part of the bridge, the vibration data being measured by at least one accelerometer;
  extracting a feature of the vibration data based on frequency analysis of the vibration data; and
  determining the health condition of the part of the bridge by a support vector machine classifier based on the feature of the vibration data.

It is an advantage that the invention applies the support vector machine classifier to determine the health condition of the part of the structure based on the feature of the vibration data. The support vector machine classifier may be determined by a learning process based on history vibration data across one or more parts of one or more structures. As a result, a physical model for the structure, which is usually complex and unknown, is not required for the invention to determine the health condition of one or more parts of the structure.

The structure may be a bridge and the part of the bridge may be a joint of the bridge.

The vibration data may comprise data in rest and data in movement, wherein the data in rest represents acceleration of the part of the bridge substantially caused by ambient factors, and the data in movement represents acceleration of the part of the structure substantially caused by an external vibration source.

The ambient factors may include wind.

The external vibration source may comprise a vehicle moving on the structure.

The method may further comprise calibrating coordinate axis directions of the at least one accelerometer based on the vibration data of the part of the structure by principal component analysis to calibrate the vibration data.

It is an advantage that calibration of the coordinate axis direction of the at least one accelerometer makes coordinate systems of the at least one accelerometer consistent and comparable.

Calibration of the coordinate axis directions of the at least one accelerometer may comprise transformation of the coordinate system of the at least one accelerometer.

Calibration of the coordinate axis directions of the at least one accelerometer may comprise aligning −Z axis direction of the at least one accelerometer with gravity direction based on the data in rest.

Calibration of the coordinate axis directions of the at least one accelerometer may comprise aligning X axis direction of the at least one accelerometer with a direction along which the external vibration source moves based on the data in movement.

The frequency analysis may comprise fast Fourier transform of the vibration data.

The feature of the vibration data may comprise amplitude spectrums of the fast Fourier transform of the vibration data.

The support vector machine classifier may comprise a classification function g taking a form of $g(E)=wE-b$, where E represents the feature of the vibration data, w and b are parameters determined by a machine learning process.

The machine learning process may comprise a supervised machine learning process.

The machine learning process may comprise an unsupervised machine learning process.

The vibration data may be stored in a datastore and the determined health score may be stored in the same or different datastore.

In a second aspect of the invention there is provided a computer software program, including machine-readable instructions, when executed by a processor, causes the processor to perform the method described above.

In a third aspect of the invention there is provided a computer system for determining a health condition of a part of a structure, the system comprising a processor that is adapted to:
  receive or access vibration data of the part of the bridge, the vibration data being measured by at least one accelerometer;
  extract a feature of the vibration data based on frequency analysis of the vibration data; and
  determine the health condition of the part of the structure by a support vector machine classifier based on the feature of the vibration data.

The processor may be further adapted to calibrate coordinate axis direction of the at least one accelerometer based on the vibration data of the part of the bridge by principal component analysis to calibrate the vibration data.

In a fourth aspect of the invention there is provided a system for determining a health condition of a part of a structure, the system comprising:

a data acquisition unit, configured to receive or access vibration data of the part of the bridge, the vibration data being measured by at least one accelerometer;

a feature extraction unit connected to the data acquisition unit, the feature extraction unit being configured to extract a feature of the vibration data based on frequency analysis of the vibration data; and a health condition determination unit connected to the feature extraction unit, the health condition determination unit being configured to determine the health condition of the part of the structure by a support vector machine classifier based on the feature of the vibration data.

The system may further comprise a data calibration unit connected with the data acquisition unit and the feature extraction unit, the data calibration unit being configured to calibrate coordinate axis direction of the at least one accelerometer based on the vibration data of the part of the bridge by principal component analysis to calibrate the vibration data.

In a fifth aspect of the invention there is provided a computer-implemented method for training a support vector machine classifier for use in determining a health condition of h part of a structure, the method comprising:

receiving or accessing vibration data of one or more parts of one or more structures measured by one or more accelerometers;

extracting two or more features of the vibration data based on frequency analysis of the vibration data; and applying a machine learning process to determine the support vector machine classifier based on the two or more features of the vibration data.

In a sixth aspect of the invention there is provided a computer software program, including machine-readable instructions, when executed by a processor, causes the processor to perform the method described directly above.

In a seventh aspect of the invention there is provided a system for training a support vector machine classifier for use in determining a health condition of a part of a structure, the system comprising:

a data acquisition unit, configured to receive or access vibration data of one or more parts of one or more structures measured by one or more accelerometers;

a feature extraction unit connected to the data acquisition unit, the feature extraction unit being configured to extract two or more features of the vibration data by frequency analysis of the vibration data; and a support vector machine trainer unit connected to the feature extraction unit, the support vector machine trainer unit being configured to apply a machine learning process to determine the support vector machine classifier based on the two or more features of the vibration data.

Optional features of a single aspect of the invention described here are also optional features of the other aspects described here where appropriate.

BRIEF DESCRIPTION OF THE DRAWINGS

At least one example of the invention will be described with reference to the accompanying drawings, in which.

It should be noted that the same numeral represents the same or similar elements throughout the drawings.

BEST MODES OF THE INVENTION

Classic vibration theories for SHM have been developed to describe characteristics of vibration of structures. However, exact physical models of the structures are usually complex and unknown. Operational and environmental variations also have significant impacts on the structures. In order to tackle these uncertainties on structures, the invention of this disclosure treats the SHM problem as a pattern recognition problem. Specifically, with utilization of historical bridge vibration data, machine learning techniques are utilized to train a classifier to detect failure patterns. The present disclosure primarily comprises (1) data calibration; (2) feature extraction; and (3) support vector machine classifier.

Figure 1:
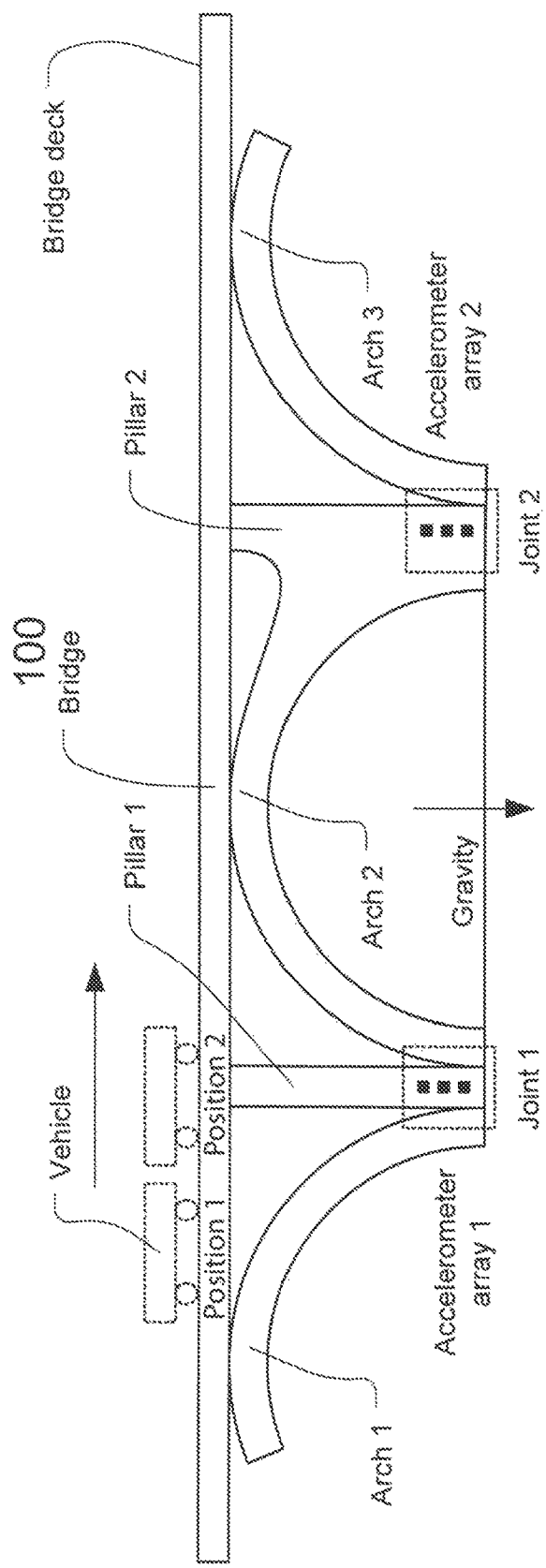
FIG. 1 shows a general structure of a bridge to be monitored for a health condition.

Examples of a structure that this disclosure relates to includes bridges, towers and other general buildings. As shown in FIG. 1, the structure of this example is a bridge 100 that is monitored for a health condition.

In FIG. 1, the bridge typically consists of multiple components, particularly, a bridge deck, pillars 1 and 2, arches 1, 2 and 3 (arches 1 and 3 are partially shown in FIG. 1).

Those components are connected together typically by mechanical means to provide workability of the bridge. As a result, a joint is formed between two or more components of the bridge. For example, joint 1 (surrounded by a dashed box in FIG. 1) is formed between the arches 1, 2 and the pillar 1; similarly, joint 2 is formed between the arches 2, 3 and the pillar 2, etc. In this example, a components and a joint of a bridge are collectively referred to as a part of a bridge. Moreover, in practice, the structure of the bridge may be different from the structure shown in FIG. 1 without departing from the spirit and scope of the invention as broadly described.

To determine the health condition of the bridge, accelerometers are installed at the joints. In FIG. 1, accelerometer array 1 consisting of three accelerometers are installed to measure vibration data representing vibration events occurring at the joint 1, and accelerometer array 2 consisting of three accelerometers are installed to measure vibration data representing vibration events occurring at the joint 2. Although three accelerometers are used for each joint in the example shown in FIG. 1, more or less accelerometers can be used where appropriate.

The vibration events are normally caused by external vibration sources for example vehicular traffic on the bridge. Particularly, when the vehicle in FIG. 1 is moving over the joint 1 on the bridge, the vehicle normally causes the joint 1 to vibrate for a period of time, which in turn causes changes to acceleration of the joint 1. Therefore, in this example, vibration data for vibration events of the joints 1 and 2 are represented by acceleration data measured at accelerometer arrays 1 and 2, respectively.

In practice, the accelerometer arrays constantly or regularly measure the acceleration data of their respective joints. As a result, the acceleration data measured by the accelerometer arrays include (1) data in rest, which are measured when the external vibration source has little effect on the corresponding accelerometer array, for example when the vehicle is at position 1 in FIG. 1, acceleration of the joint 1 is substantially caused by ambient factors such as wind instead of the vehicle and (2) data in movement, which are measured when the external vibration source has substantial effect on the corresponding accelerometer array, or the vibration event actually happens, for example when the vehicle is moving at position 2 in FIG. 1, acceleration of the joint 1 is substantially caused by the vehicle instead of the ambient factors.

Figure 2:
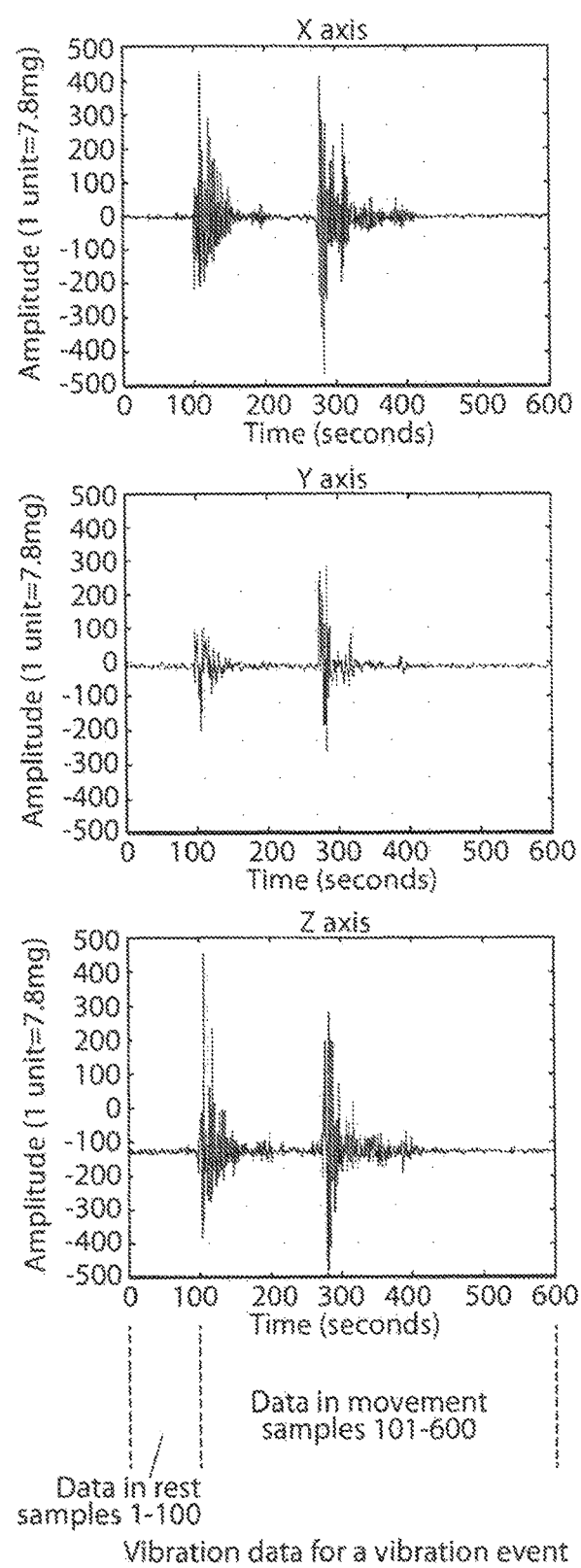
FIG. 2 is an illustrative diagram of vibration data measured by an accelerometer.

FIG. 2 is an illustrative diagram of vibration data for a vibration event measured by an accelerometer typically a 3-axis accelerometer.

The accelerometer normally measures acceleration data in 3 directions based on its 3-D coordinate system consisting of X, Y and Z axes. Therefore, an output of the accelerometer can be considered as a 3-D vector with X, Y and Z components.

In order to measure the vibration data for a vibration event with respect to the joints 1 and 2, each accelerometer in the respective accelerometer array measures acceleration amplitude for all 3 axes at a frequency of 400 Hz for 1.5 seconds. As a result, outputs of each accelerometer in respective accelerometer array form 600 samples of the vibration event with each sample being represented by a 3-D vector. X, Y and Z components of the samples are shown in FIG. 2.

In this embodiment, vibration data of the X, Y, and Z components for the first 100 samples have smaller vibration amplitude, and the vibration amplitude abruptly change from the $101^{st}$ sample, which means a vibration event actually starts from the $101^{st}$ sample, as shown in FIG. 2. In other words, the vibration data for the first 100 samples is data in rest, and the vibration data for the rest of the samples is data in movement. The vibration data may be arranged in other ways without departing from the spirit and scope of the present invention as broadly described.

Figure 3:
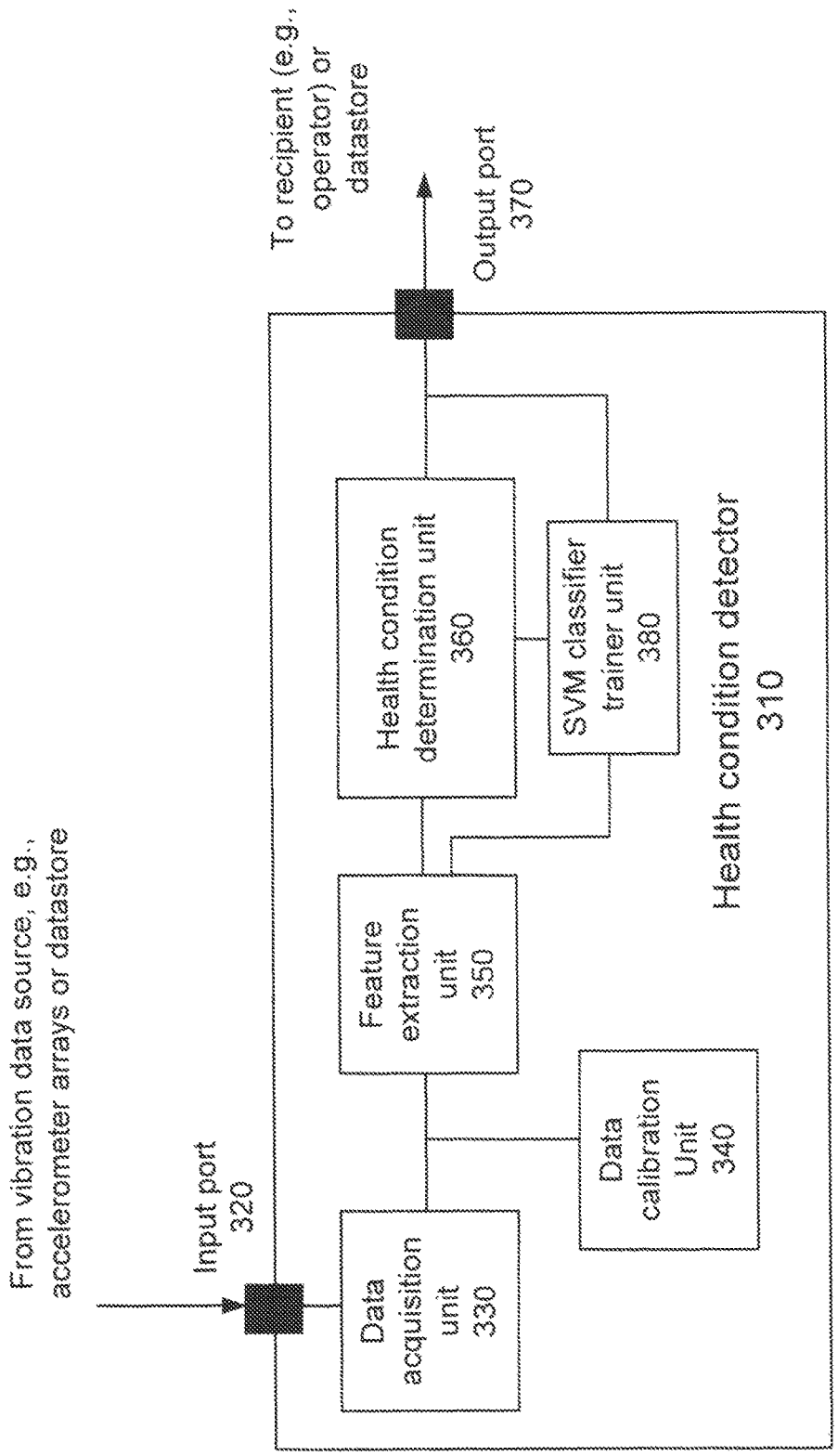
FIG. 3 is a diagram of a health condition detector for detection of a health condition of a bridge according to an embodiment.

FIG. 3 is a diagram of a health condition detector 310 for determining a health condition of a bridge according to an embodiment of the present invention. The health condition detector 310 includes an input port 320, a data acquisition unit 330, a data calibration unit 340, a feature extraction unit 350, a health condition determination unit 360, a support vector classifier trainer unit 380 and an output port 370. The health condition detector 310 determines the health condition of the bridge based on vibration data of the bridge without establishing a physical model of the bridge. In this example, the health condition detector 310 is also be used to train the support vector machine classifier used to determine the health condition of the bridge.

It should be noted that the units in the health condition detector 310 can be connected directly or indirectly, physically or logically.

The links between the ports and units in the health condition detector 310 may be physical links or logical links or their combinations where appropriate.

Input Port

The input port 320 is an interface with a data source from which vibration data for vibration events is obtained. The data source may be the accelerometer arrays 1 and 2 when the health condition detector 310 is used in real-time. Alternatively, the data source may be a datastore (not shown in FIG. 3) that stores the vibration data measured by the accelerometer arrays.

Data Acquisition Unit

The data acquisition unit 330 receives the vibration data for the vibration events from the data source via the input port 320; alternatively, the data acquisition unit 330 may access the vibration data at the data source.

Generally speaking, when the accelerometers are installed at the joints 1 and 2, the orientations of their respective coordinate systems are different from each other. As a result, it is impractical to compare and process the vibration data from different accelerometers. Although physical or manual calibration of accelerometers can solve this problem, this usually causes extra efforts and costs. Therefore, in this embodiment, before the vibration data from each accelerometer is further processed, the vibration data is sent to the data calibration unit 340 to calibrate their respective coordinate systems automatically.

Data Calibration Unit

Figure 4:
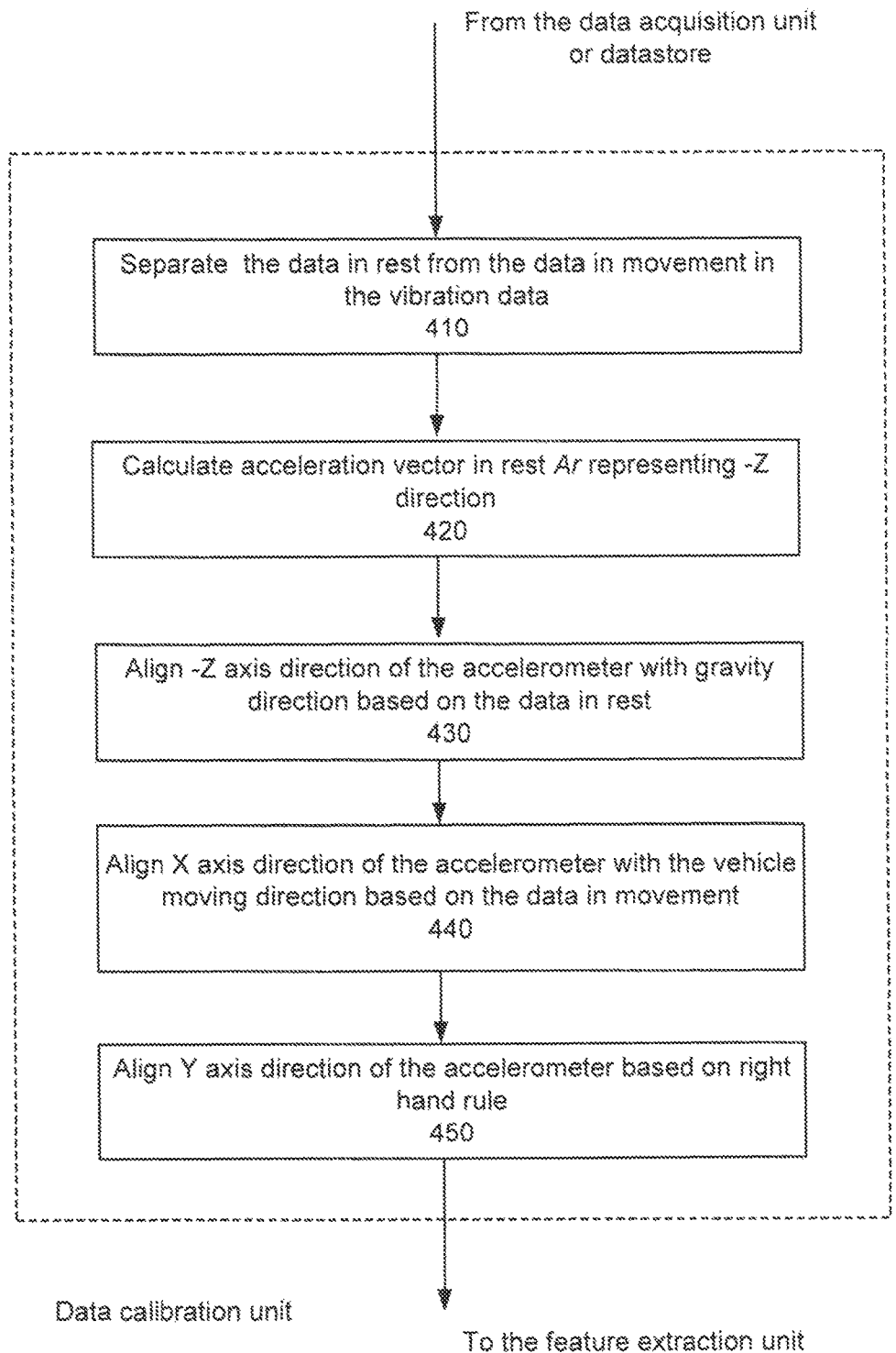
FIG. 4 is a flow chart of calibrating vibration data according to an embodiment.

The data calibration unit 340 is now described with reference to FIGS. 4 and 5, which calibrates, i.e., mathematically transforms, the coordinate systems of the accelerometers to make them consistent and comparable.

Upon receipt of the vibration data for the vibration events at the data calibration unit 340 from the data acquisition unit 330, the data calibration unit 340 separates 410 the data in rest from the data in movement in the vibration data for the vibration events.

The calibration is performed by two steps: (1) Z axis alignment, aligning −Z direction with gravity; (2) XY axes alignments, on horizontal plane, the direction with maximum variance is selected as new X axis, and new Y axis is determined by the right hand rule accordingly. With such calibration or transformation, the new coordinate systems of the accelerometers are consistent, comparable and comply with right hand coordinate system.

Figure 5A:
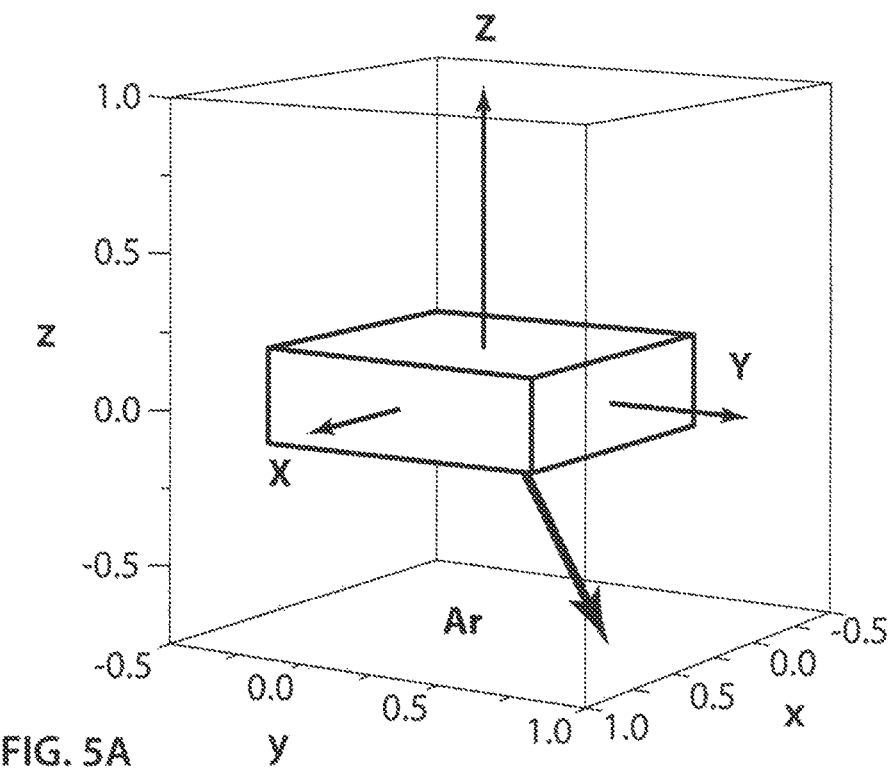
FIG. 5A-5D are illustrative diagrams to show transformation of coordinate system of the at least one accelerometer according to an embodiment.

Then data calibration unit 340 then calculates 420 an acceleration vector in rest Ar, which is a 3-D vector $\langle x_{Ar}, y_{Ar}, z_{Ar}\rangle$, representing the acceleration of an accelerometer when no vibration event occurs at the joint, in this case, the acceleration of the accelerometer is substantially caused by the ambient factors. The acceleration vector in rest Ar is obtained by averaging the first 100 samples' vibration magnitudes (at all the 3 axes) of all the vibration events with respect to an accelerometer. Thus, direction of Ar is consistent with direction of gravity in the accelerometer's coordinate system, as shown in FIG. 5A.

The first step of the calibration is to make the new—Z axis of the coordinate system of the accelerometer point to the gravity direction or the direction of Ar. It is achieved by rotating the original coordinate system twice. The first rotation is performed along the original X axis on the original YZ plane. The angle between—Z and Ar's projection on plane YZ, denoted as $\theta_{ArZ}^{YZ}$, is calculated by:

$$\theta_{ArZ}^{YZ} = \cos^{-1}\left\{\frac{(y_{Ar}, z_{Ar})(0, -1)}{\|y_{Ar}, z_{Ar}\|_2}\right\}.$$

The first rotation matrix can be obtained accordingly:

$$M_{ArZ}^{YZ} = \begin{bmatrix} \cos\theta_{ArZ}^{YZ} & \sin\theta_{ArZ}^{YZ} \\ -\sin\theta_{ArZ}^{YZ} & \cos\theta_{ArZ}^{YZ} \end{bmatrix}.$$

After the first rotation, X axis remains unchanged. Y and Z axes are changed. Thus, Ar's second and third components are updated by:

$$\begin{bmatrix} y'_{Ar} \\ z'_{Ar} \end{bmatrix} = M_{ArZ}^{YZ} \begin{bmatrix} y_{Ar} \\ z_{Ar} \end{bmatrix}$$

The second rotation is performed along current Y axis on the current XZ plane. The angle between current −Z axis and current Ar on the current XZ plane, denoted as $\theta_{ArZ}^{XZ}$, is calculated by:

$$\theta_{ArZ}^{XZ} = \cos^{-1}\left\{\frac{(x_{Ar}, z'_{Ar})(0, -1)}{\|x_{Ar}, z'_{Ar}\|_2}\right\}$$

The second rotation matrix is obtained by:

$$M_{ArZ}^{XZ} = \begin{bmatrix} \cos\theta_{ArZ}^{XZ} & \sin\theta_{ArZ}^{XZ} \\ -\sin\theta_{ArZ}^{XZ} & \cos\theta_{ArZ}^{XZ} \end{bmatrix}$$

Figure 5B:
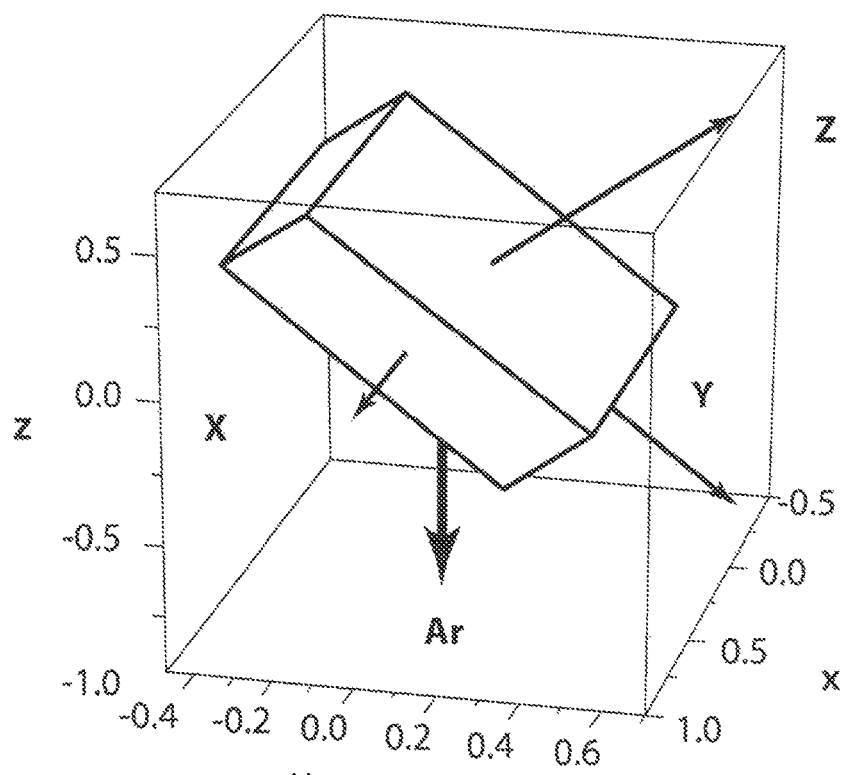

After the second rotation, Y axis remains unchanged. X and Z axes are changed. As a result of the above two rotations, −Z axis is aligned 430 with Ar, i.e. the gravity direction, as shown in FIG. 5B.

Figure 5C:
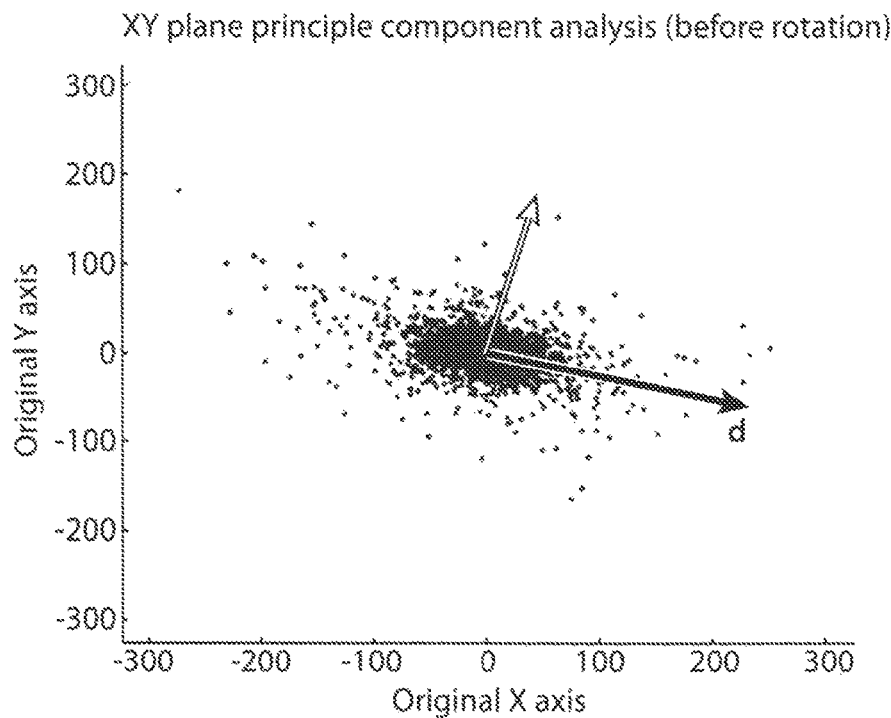
Figure 5D:
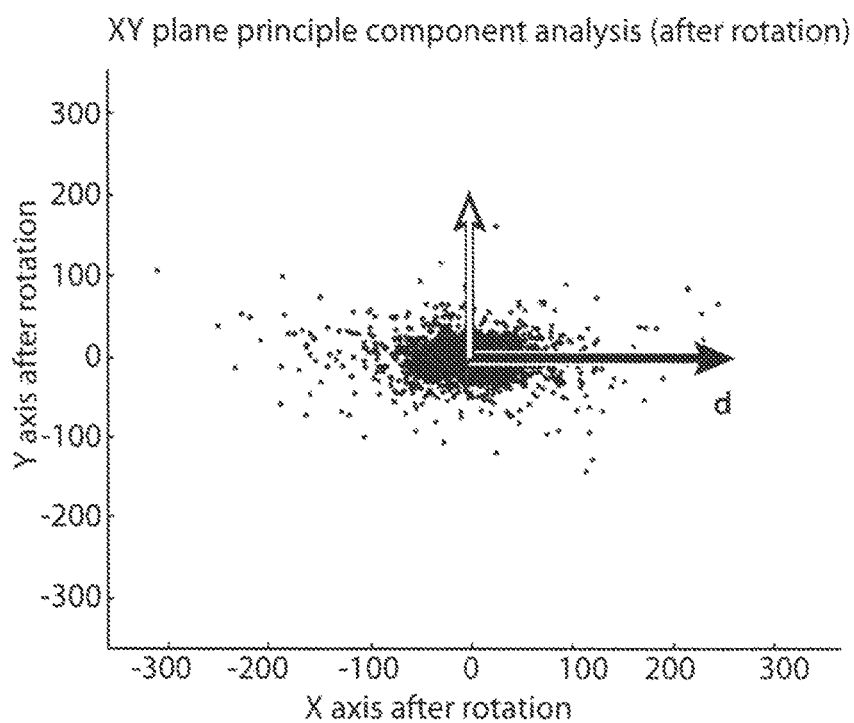

The second step of calibration is to determine directions of X and Y axes. X and Y axes represent orthogonal directions in horizontal plane. The absolute values of the coordinates in FIGS. 5C and 5D represent amplitudes. The sign represents direction. Particularly, a positive value means the acceleration has the same direction as the axis, and a negative value means the acceleration has the opposite direction. Zero means there is no acceleration. Acceleration is caused by a force and it also represents movement in terms of both direction and distance. High acceleration implies long distance movement. Therefore, the X/Y coordinate system can reflect the movements of an accelerometer and a bridge joint to which the accelerometer is applied. The arrow "d" in FIGS. 5C and 5D represents the direction on which the majority of the vibration events happen. The assumption is that the majority vibration events are caused by the vehicle moving on the bridge. Thus, "d" also indicates the vehicle moving direction, as shown by the arrow above the vehicle in FIG. 1. In the second step, the data in rest, which is the first 100 samples in the vibration data for each vibration event, are ignored, and only the data in movement is considered as the data in rest do not represent acceleration data when the vibration event actually happens.

The data in movement for each vibration event is projected on the horizontal plane, as shown in FIG. 5C. Each dot in FIG. 5C represents a projection of each sample in the data in movement for each vibration event measured by an accelerometer. The arrow d in FIG. 5C shows the direction on which the most vibrations happen.

The desired direction represented by d is the direction with the maximum variance of the dots' locations. With $u=(x_u, y_u)$ representing a dot on the horizontal plane, these dots' variance projected on d can be computed by:

$$\frac{1}{N}\sum_{n=1}^{N} \{d^T u_n - d^T \bar{u}\}^2 = d^T S d$$

where N denotes the number of dots, $$\bar{u} = \frac{1}{N}\sum_{n=1}^{N} u_n$$

and S is the covariance matrix of u. Thus, d can be obtained by solving the following optimization problem:

$$\max_{d} d^T S d$$
$$\text{subject to:} d^T d = 1$$

Lagrange multiplier can be applied to convert the constrained maximization problem into an unconstrained maximization problem:

$$d^T S d + \lambda(1 - d^T d)$$

The solution can be obtained by making the derivative equal to zero, which leads to:

$$Sd = \lambda d.$$

It can be seen from the above equation that d and λ are eigenvector and eigenvalue for S, respectively. Since $d^T S d = \lambda$, d will be the direction with maximum variance when λ is the largest eigenvalue.

Once d is determined, the angle between the original X axis and d can be determined. The coordinate system can be rotated accordingly to make the new X axis aligned 440 with d, as shown in the FIG. 5D.

After the new Z and X axes are determined, the new Y axis is aligned 450 by right hand rule, as known to a person skilled in the art.

The above process is repeated by the data calibration unit 340 for each accelerometer to calibrate the coordinate axis directions of all accelerometers, the vibration data including the data in rest and the data in movement for the vibration events are represented by the new and consistent coordinate system across each accelerometer. Then the vibration data is sent to the feature extraction unit 350 for feature extraction.

Feature Extraction Unit

Figure 6:
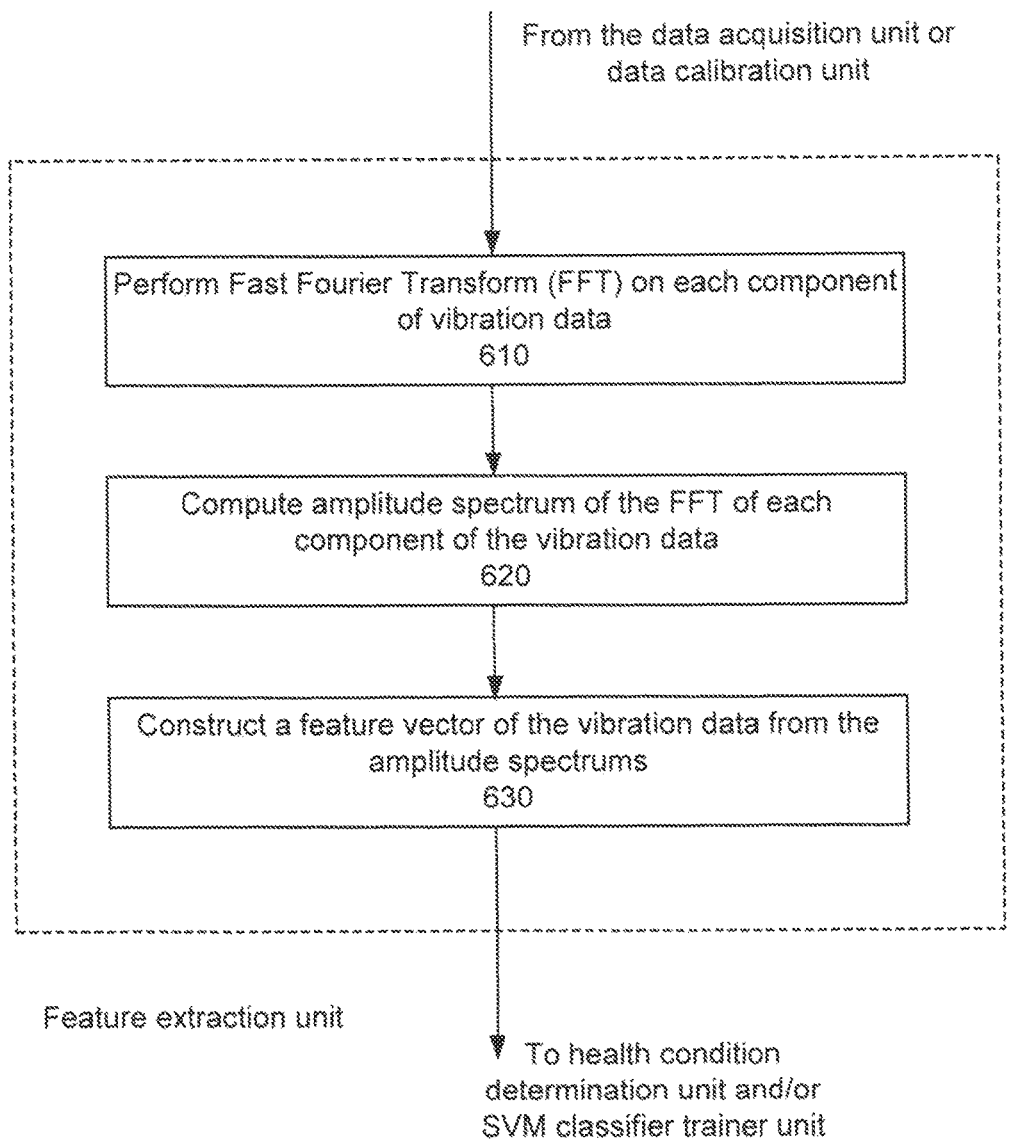
FIG. 6 is a flow chart of extracting a feature vector of vibration data according to an embodiment.

The feature extraction unit 350 will now be described with reference to FIG. 6.

The feature extraction unit 350 identifies the samples that comprise a vibration event received from the data acquisition unit 330, or the data calibration unit 340 if the coordinate systems of the accelerometers are calibrated.

Then fast Fourier transform (FFT) is performed 610 on the time domain vibration data for the vibration event. It is an advantage that the use of frequency analysis avoids the issues with time domain features, since time domain vibration signals vary from vehicle to vehicle significantly. Both weight and speed impacts on the time domain vibration signal, for example, vibration magnitude peaks and can appear at different times and is difficult to calibrate. In the frequency domain, vibration energy is measured by frequency spectrum which is comparable and invariant to time shift allowing for the discovery of subtle patterns.

Take the components on X axis as an example, the X axis components of the vibration data for the vibration event is converted from time domain ($x_j$) into frequency domain $A(f_x)$ by:

$$A(f_x) = \sum_{j=1}^{600} x_j \omega_{600}^{(j-1)(f_x-1)},$$

where $$\omega_{600} = e^{\frac{-2\pi i}{600}},$$

$f_x$ represents frequency, and $x_j$ represents one of the 600 time domain samples on X axis.

Then the absolute value $|A(f_x)|$ is computed 620 to represent an amplitude spectrum of the FFT.

Amplitude spectrums across X, Y and Z axes of all accelerometers applied to a joint are then concatenated to construct 630 a vector E, which is a feature vector of the vibration data for the vibration event. It should be noted that in the example shown in FIG. 1 as three accelerometers are applied to each joint, the feature vector E is a 9-D vector.

The feature vector is then sent to the health condition determination unit 360 to determine the health condition of the joint of bridge and/or the support vector classifier trainer unit 380 to train the classifier to detect unhealthy patterns.

Health Condition Determination Unit

Figure 7:
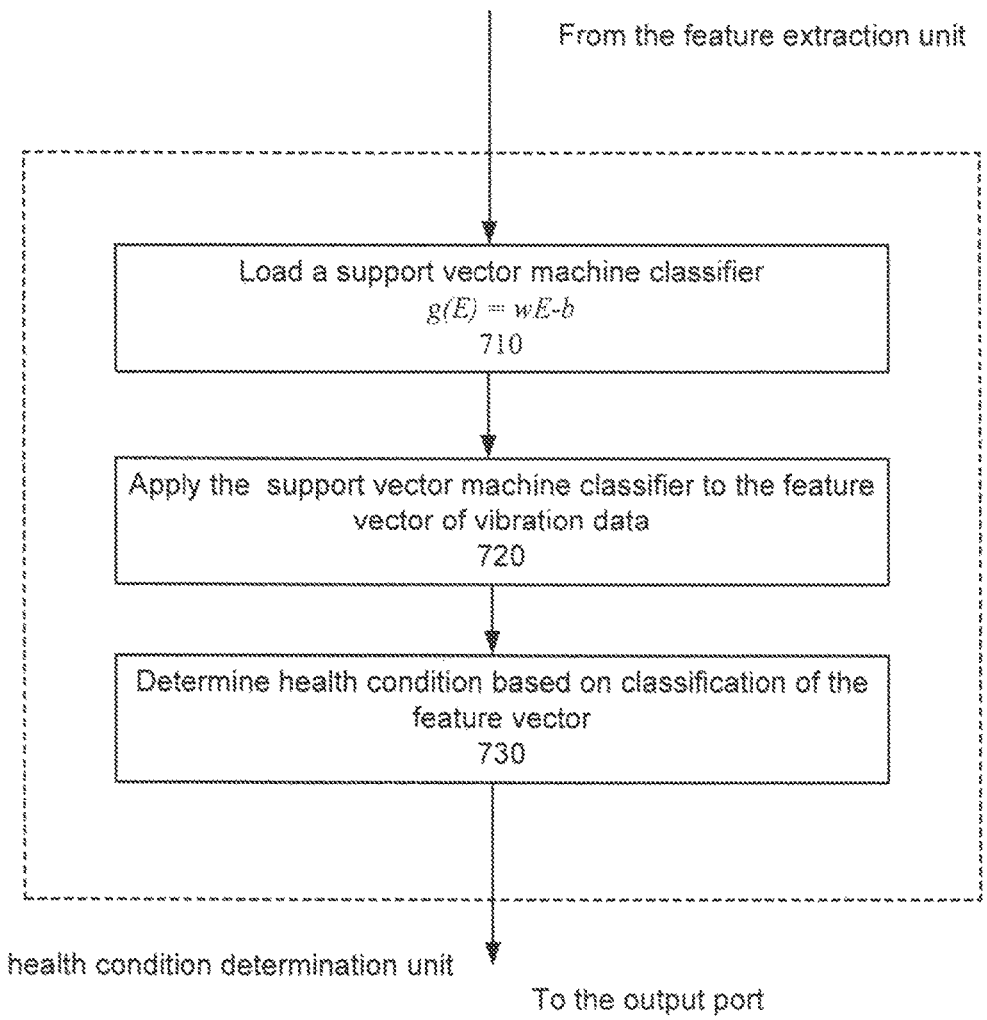
FIG. 7 is a flow chart of classifying a feature vector of vibration data according to an embodiment.

The health condition determination unit 360 will now be described with reference to FIG. 7.

Upon receipt of the feature vector E from the feature extraction unit 350, the health condition determination unit 360 loads 710 a support vector machine classifier, for example from the support vector training unit 380 (described below). The support vector machine classifier has a classification function g taking a form of g(E)=wE−b, where E represents the feature vector of the vibration data, w and b are parameters determined by a machine learning process.

Then the support vector machine classifier is applied 720 to the feature vector E to obtain an outcome of the support vector machine classifier, which is considered as a health score to measure the health condition of the joint of the bridge.

The health score can be any suitable measure that shows the health according to some known scale. For example a health score in this example is a signed real value. A negative value means that the feature vector is associated with a faulty joint, and a positive value means that the feature vector is associated with a normal joint. The absolute value of the health score indicates a confidence level of classification. For instance, if the health value is −20, it means that it is determined that the joint is a faulty joint with a confidence level of 20.

A health score can be determined for multiple feature vectors E extracted from vibration data from the same joint of the bridge. An overall health score for that part of the bridge can be determined for a specific period of time such as a week. For example, the health scores determined for each vibration event of that part of the bridge and in turn feature vector E can be averaged.

Then when the health score for that part of the bridge is sent to a recipient for example the operator of the bridge via the output port 370 for further decision making. The health score in this example is stored in storage (not shown). The health scores can then be automatically analysed, such as producing graphs and a statistical report of the health scores of one or more parts of the bridge over time. The report may indicate whether a threshold indicative of poor health of one or more parts of a bridge is indicated so as to prioritise manual inspection and restorative action.

Features vectors E extracted from vibration events from a different part of the bridge can be used to determine a separate health score for that different part of the bridge.

Training of the SVM Classifier

Figure 9:
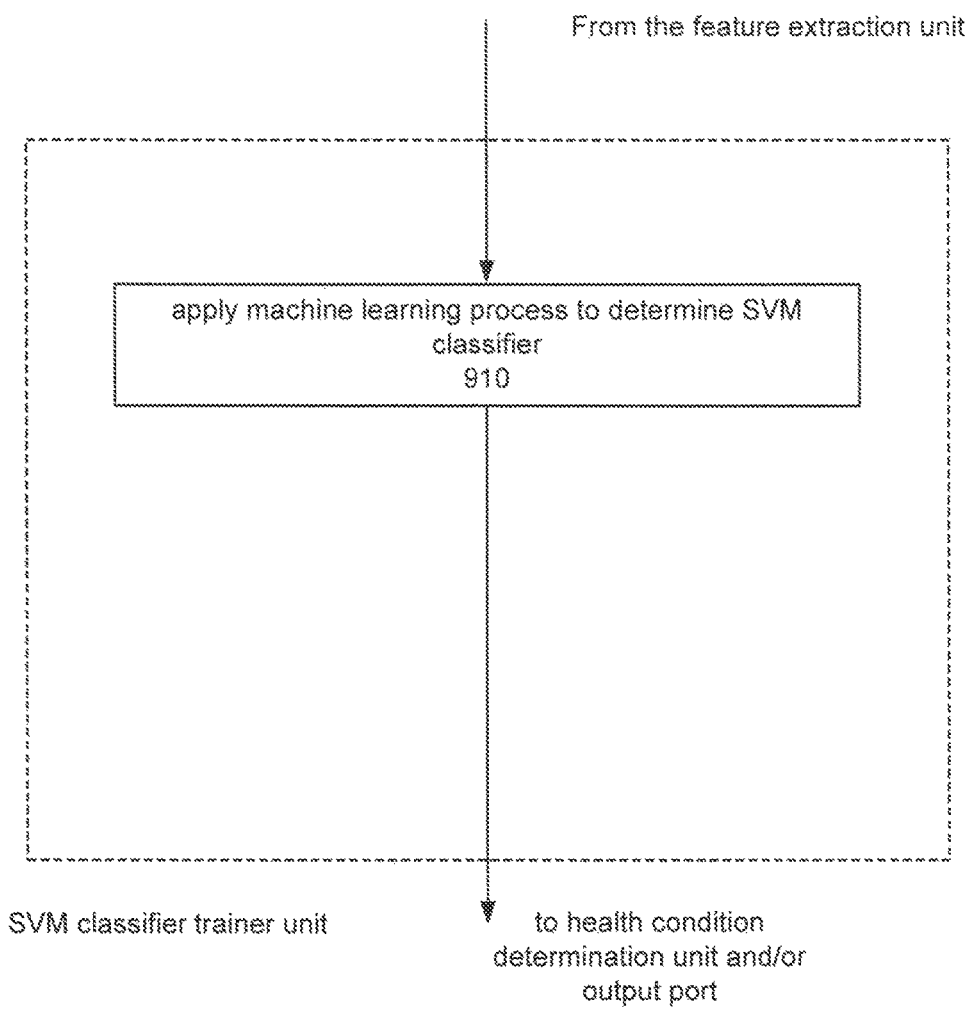
FIG. 9 is a flow chart of training a support vector machine classifier according to an embodiment.

The support vector machine trainer unit 380 will now be described with reference to FIG. 9.

As described above, the parameters w and b of the classification function are determined by a machine learning process 910 performed in this example by the support vector classifier training unit 380. This machine learning process 910 is based on history vibration data across one or more parts of the bridge that may include neighbour parts. The history vibration data is in the form of feature vectors E determined by the feature extraction unit 350. The support vector machine classier training unit 380 then makes the determined support vector machine classifier available to the health condition determination unit 360 for application.

The support vector machine classifier training unit 380 may perform the machine learning process at intervals to update the support vector machine classier and typically the most up to date version of the support vector machine classifier is received and applied by the health condition determination unit 360. It is an advantage of this example that the support vector classifier is continuously improved by incrementally learning from new incoming vibration data.

In one example, the support vector machine classifier is improved by training with vibration data calibrated to manual inspection scores so as to better account for interference. That is, some features extracted from the vibration data that are provided as input to the support vector machine classifier trainer unit 380 may be labelled manually with a health score as determined manually by visual inspection of the relevant part of the bridge. In this way the support vector machine classifier trainer unit 380 continues to improve the support vector classifier.

Further the use of features extracted from vibration data from one or more other structures or other parts of the same structure means that transfer learning is also achieved by the support vector classifier training unit 380.

The determined support vector classifier can be provided to the output port 370 where it can be stored in a datastore, such as computer memory. The support vector machine classifier can then be retrieved from memory, such as by a different health condition detector 310 for application.

In this specification, the machine learning 910 is supervised learning and/or unsupervised learning processes that train the SVM classifier so as to determine the parameters w and b, as described below.

Supervised Learning

The health condition of a part of a bridge such as a joint is described by its vibration data for a vibration event caused by a moving vehicle. And the vibration data is characterised by the amplitude spectrums of its FFT, namely the feature vector E as described above.

Supervised learning is performed on E to train a support vector machine classifier, with history vibration data to differentiate faulty bridge parts from normal ones.

The history vibration data for faulty and normal parts is grouped as positive and negative class, respectively, to train the classifier. And the obtained classifier is then applied to new vibration data to determine whether the new vibration data represents a normal joint or a faulty one.

From the history vibration data, feature vectors E and their labels can be determined. Specifically, $E \in R^c$ represents the vibration amplitude spectrums for vibration events, as described above, where c indicates the number of different frequencies. The label of the feature vector is represented by $y \in \{-1,1\}$, where $y=-1$ means that E is extracted from history vibration data for a faulty part and $y=1$ otherwise. The classification model is a classification function $g: R^c \rightarrow \{-1,1\}$. The classification function takes the form of $g(E)=wE-b$, where w and b are the parameters of the model, which are determined from the supervised learning process.

Given a set of n training samples, i.e., history feature vectors and their labels, $\{(E_i,y_i)\}_{i=1}^n$, the learning process is to determine the model parameters w and b by making sure that the classification error of the obtained model $g(E)=wE-b$ on the training samples $\{(E_i,y_i)\}_{i=1}^n$ is minimized. Mathematically, the learning process is equivalent to the following minimization problem:

$$\min_{w,\xi,b} \frac{1}{2}\|w\|^2 + C\sum_{i=1}^n \xi_i$$

$$s.t. \quad y_i(wE_i - b) \geq 1 - \xi_i, \xi_i \geq 0, i \in [1, n],$$

where $\xi_i$ is the slack variable which controls how much classification error is allowed for the training sample $E_i$. The slack variable is introduced into the training objective function because the training data might not be separable sometimes and the slack variable allows us to find a relatively accurate hyper plane to split training data in terms of their labels, C is the variable to control the balance between $$\frac{1}{2}\|w\|^2 \text{ and } \sum_{i=1}^n \xi_i.$$

The former can be understood as the complexity of the mode, and the later represents classification error. The learning objective is to minimize both classification error and model complexity. Thus, C controls the influences of the two factors on the learning objective.

This minimization problem can be solved by Lagrangian multiplier and quadratic programming. Once the classification function $g(E)=wE-b$ is determined, a health score for a new feature vector, denoted as $E_{new}$, can be generated as $g(E_{new})=wE_{new}-b$. Then an overall health score for a part of a bridge in a specific time period can be obtained by the averaging health scores over all the vibration events measured.

Unsupervised Learning

One-class support vector machine is an unsupervised kernel-based approach for anomaly detection. It assumes that all positive training samples share some common properties to form one class. And negative training samples can have very different properties without any commonness. It fits health condition determination in structural health monitoring, since there may exist many failure patterns and one-class SVM can cover all of them as outliers. Using unsupervised learning no labelled training data is needed so that means no model of the structure is needed and no prior knowledge is needed of whether a part of the structure is damaged in order to use the respective vibration data. As a result using unsupervised learning the resulting classifier can account for unknown failure patterns.

Follow the settings of supervised learning, the unsupervised learning process can be regarded as the following optimization problem:

$$\min_{w,\xi,h} \frac{1}{2}\|w\|^2 + \frac{1}{vl}\sum_{i=1}^n \xi_i$$

$$s.t. \quad wE_i \geq b - \xi_i, \xi_i \geq 0, i \in [1, n],$$

where l represents the number of training samples;

v has the similar function as C, which controls the balance between model complexity $$\frac{1}{2}\|w\|^2$$

and classification error $$\sum_{i=1}^n \xi_i.$$

It is worth noting that the training samples $\{E_i\}_{i=1}^n$ only contain feature vectors and no label information is provided. The optimization problem can be solved by Lagrangian multiplier and quadratic programming. Once the classification function is obtained, a health score is generated in a same way as the supervised learning.

Experimental Results

Figure 8:
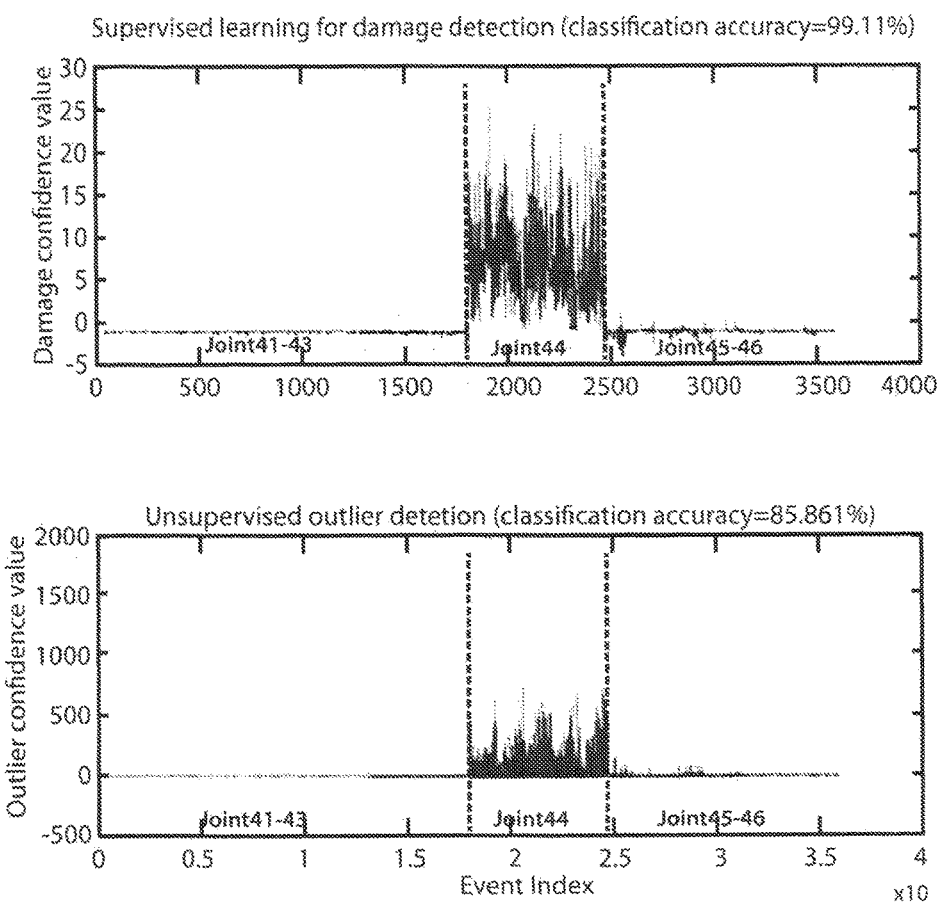
FIG. 8 is a diagram showing experimental results of determining a health condition of a bridge according to an embodiment of the present invention.

This invention is tested on 6 bridge joints including one faulty joint. Around 3000 vibration events are measured for each joint. 10-fold cross-validation is performed for evaluating the invention. Experiment results show that the method can achieve more than 99% and 85% of classification accuracy for supervised and unsupervised learning, respectively, as shown in FIG. 8.

It will be appreciated by persons skilled in the art that numerous variations and/or modifications may be made to the invention as shown in the specific embodiments without departing from the spirit and scope of the invention as broadly described.

For example, the part the health condition of which is to be determined may be the joint between the bridge deck and the pillar 1 or 2.

In another example, the number of the accelerometers in an accelerometer array that is used to measure vibration data for vibration events may be just one, which leads to a simpler 3-D feature vector instead of the 9-D feature vector in the embodiment described above.

Although the health condition detector 310 is shown as an independent entity in FIG. 3, it may also be a logical or physical part of a computing device for example a desktop, a laptop, a handheld device.

In another embodiment, the health condition detector 310 may be implemented as a computer program including instructions performed by a processor(s) of a computing device to detect the health condition of a bridge.

In a further embodiment, the ports and units in the health condition detector 310 may be distributed across multiple entities to perform their respective functions.

Further, the application of the present invention is not intended to be limited to structural health condition determination; it may also be applied to bridge traffic condition analysis based on bridge joint vibrations.

The health condition detector 310 in this example performs both functions of determining the health of part of the bridge and trains the support vector machine classifier. In other examples, these two functions could be performed by separate devices. In this case, in each entity only the units needed to perform the separate functions need be included. For example, a device that determines the health condition of part of the bridge need not have the support vector classifier trainer unit 380. Further, a device that trains the support vector machine classifier need not have the health condition determine unit 360. If it is preferred not to process the vibration data twice, the data acquisition unit 330, data calibration unit 340 and the feature extraction unit 350 could be included in only a first entity. The features extracted by the feature extraction unit 350 are then received by the other entity or accessed from datastore where the first entity caused them to be stored.

It should be understood that the techniques of the present disclosure might be implemented using a variety of technologies. For example, the methods described herein may be implemented by a series of computer executable instructions residing on a suitable computer readable medium. Suitable data store is computer readable media that can include volatile (e.g. RAM) and/or non-volatile (e.g. ROM, disk) memory, carrier waves and transmission media. Exemplary carrier waves may take the form of electrical, electromagnetic or optical signals conveying digital data steams along a local network or a publically accessible network such as the internet.

It should also be understood that, unless specifically stated otherwise as apparent from the following discussion, it is appreciated that throughout the description, discussions utilizing terms such as "receiving" or "sending" or "obtaining" or "calculating" or "storing" or "determining" or the like, refer to the action and processes of a computer system, or similar electronic computing device, that processes and transforms data represented as physical (electronic) quantities within the computer system's registers and memories into other data similarly represented as physical quantities within the computer system memories or registers or other such information storage, transmission or display devices.

The invention claimed is:

1. A computer-implemented method, comprising:
monitoring a building structure by constantly or regularly performing the steps of:
receiving or accessing vibration data of a part of the structure, the vibration data being measured by two or more accelerometers and, the vibration data representing acceleration of the part of the structure substantially caused by an external vibration source;
transforming the vibration data by aligning an axis direction of the vibration data from each of the two or more accelerometers with a direction corresponding to maximum variance of the vibration data to create calibrated vibration data;
extracting an amplitude for a frequency of the calibrated vibration data based on frequency analysis of the calibrated vibration data; and
determining a health condition of the part of the structure by a support vector machine classifier based on the amplitude for the frequency.

2. The method according to claim 1, wherein the vibration data comprises data in rest and data in movement, wherein the data in rest represents acceleration of the part of the structure substantially caused by ambient factors, and the data in movement represents the acceleration of the part of the structure substantially caused by an external vibration source.

3. The method according to claim 2, wherein the method further comprises:
calibrating coordinate axis directions of the two or more accelerometers based on the vibration data of the part of the structure by principal component analysis to calibrate the vibration data.

4. The method according to claim 3, wherein calibrating coordinate axis directions of the two or more accelerometers comprises aligning an axis direction of the at least one accelerometer with a direction along which the external vibration source moves based on the data in movement.

5. The method according to claim 1, wherein the vibration data is stored in a datastore and the determined health condition is stored in the same or different datastore.

6. The method according to claim 1, wherein the frequency analysis comprises fast Fourier transform of the vibration data.

7. The method according to claim 6, wherein extracting the amplitude for a frequency comprises extracting an amplitude spectrum of the fast Fourier transform of the calibrated vibration data.

8. The method according to claim 1, wherein the support vector machine classifier comprises a classification function g taking a form of $g(E)=wE-b$, where E represents feature vectors of the vibration data, w and b are parameters determined by a machine learning process.

9. The method according to claim 8, wherein the machine learning process comprises an unsupervised machine learning process.

10. A non-transitory computer-readable medium, including computer-executable instructions stored thereon that when executed by a processor causes the processor to perform the method of claim 1.

11. A system for determining a health condition of a part of a structure, the system comprising:
two or more accelerometers providing vibration data,
a processor configured to monitor a building structure by constantly or regularly performing the steps of:
receiving or accessing the vibration data of the part of the structure, the vibration data being measured by the two or more accelerometers, the vibration data representing acceleration of the part of the structure substantially caused by an external vibration source;
transforming the vibration data by aligning an axis direction of the vibration data from each of the two or more accelerometers with a direction corresponding to maximum variance of the vibration data to create calibrated vibration data;
extracting an amplitude for a frequency of the calibrated vibration data based on frequency analysis of the calibrated vibration data; and
determining the health condition of the part of the structure by a support vector machine classifier based on the amplitude for the frequency.

12. A computer-implemented method for training a support vector machine classifier, the method comprising:
- monitoring a building structure by constantly or regularly performing the steps of:
- receiving or accessing vibration data of one or more parts of one or more structures measured by two or more accelerometers, the vibration data representing acceleration of the part of the structure substantially caused by an external vibration source;
- transforming the vibration data by aligning an axis direction of the vibration data from each of the two or more accelerometers with a direction corresponding to maximum variance of the vibration data to create calibrated vibration data;
- extracting two or more amplitudes for a frequency of the calibrated vibration data based on frequency analysis of the calibrated vibration data; and
- applying a machine learning process to determine the support vector machine classifier based on the two or more amplitudes for a frequency.

13. A non-transitory computer-readable medium, including computer-executable instructions, stored thereon that when executed by a processor, causes the processor to perform the method of claim 12.

14. A system for training a support vector machine classifier for use in determining a health condition of a part of a structure, the system comprising:
- two or more accelerometers providing vibration data of the part of the structure,
- a processor configured to monitor a building structure by constantly or regularly performing the steps of:
- receiving or accessing the vibration data of the part of the structure, the vibration data being measured by the two or more accelerometers, the vibration data representing acceleration of the part of the structure substantially caused by an external vibration source;
- transforming the vibration data by aligning an axis direction of the vibration data from each of the two or more accelerometers with a direction corresponding to maximum variance of the vibration data to create calibrated vibration data;
- extracting two or more amplitudes for a frequency of the calibrated vibration data based on frequency analysis of the calibrated vibration data; and
- applying a machine learning process to determine the support vector machine classifier based on the two or more amplitudes for a frequency.

\* \* \* \* \*